United States Patent
Yi et al.

(10) Patent No.: US 6,794,077 B2
(45) Date of Patent: Sep. 21, 2004

(54) PASSIVE WATER MANAGEMENT FUEL CELL

(75) Inventors: Jung S. Yi, Mansfield, CT (US); Deliang Yang, Vernon, CT (US); Richard D. Breault, North Kingstown, RI (US); Albert P. Grasso, Vernon, CT (US); Glenn W. Scheffler, Thiland, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 318 days.

(21) Appl. No.: 10/036,181

(22) Filed: Dec. 28, 2001

(65) Prior Publication Data

US 2003/0124410 A1 Jul. 3, 2003

(51) Int. Cl.[7] ................................................. H01M 2/02
(52) U.S. Cl. ............................ 429/34; 429/13; 429/25; 429/26; 429/30; 429/38; 429/39; 95/55; 95/56; 95/90; 95/96; 95/99
(58) Field of Search ............................... 429/34, 39, 13, 429/25, 26, 30, 38; 95/55, 56, 90, 96, 99

(56) References Cited

U.S. PATENT DOCUMENTS

| | | | |
|---|---|---|---|
| 6,174,616 B1 | 1/2001 | Marvin et al. | |
| 6,303,245 B1 | 10/2001 | Nelson | |
| 6,322,915 B1 * | 11/2001 | Collins et al. | 429/13 |
| 6,503,298 B1 * | 1/2003 | Monzyk et al. | 95/96 |
| 2002/0106546 A1 * | 8/2002 | Perry et al. | 429/34 |

* cited by examiner

Primary Examiner—Randy Gulakowski
Assistant Examiner—Gentle E. Winter
(74) Attorney, Agent, or Firm—M. P. Williams

(57) ABSTRACT

A proton exchange membrane (PEM) fuel cell includes fuel and oxidant flow field plates (26, 40) having fuel and oxidant channels (27, 28; 41, 44), and water channels, the ends (29, 48) of which that are adjacent to the corresponding reactant gas inlet manifold (34, 42) are dead ended, the other ends (31, 50) draining excess water into the corresponding reactant gas exhaust manifold (36, 45). Flow restrictors (39, 47) maintain reactant gas pressure above exit manifold pressure, and may comprise interdigitated channels (65, 66; 76, 78). Solid reactant gas flow field plates have small holes (85, 88) between reactant gas channels (27, 28; 41) and water drain channels (29, 30; 49, 50). In one embodiment, the fuel cells of a stack may be separated by either coolant plates (51) or solid plates (55) or both. In a second embodiment, coolant plates (51a) have weep holes (57) that inject water into the ends (29) of the reactant gas water channels which are in the region of the inlet manifold (34), thereby assuring humidification of the reactants.

8 Claims, 6 Drawing Sheets

PASSIVE WATER MANAGEMENT FUEL CELL

TECHNICAL FIELD

This invention relates to a proton exchange membrane (PEM) fuel cell in which porous reactant gas flow field plates have water flow fields on the reverse sides thereof which are dead-ended near the inlet of the corresponding reactant gas and which drain into the corresponding reactant gas exhaust manifold.

BACKGROUND ART

Water management in PEM fuel cells includes carrying the product water (resulting from the fuel cell process) and proton drag water (carried through the membrane from the anode side) away from the cathode, while at the same time ensuring that the membrane remains moist, particularly on the anode side. Recent designs of PEM fuel cells employ water transport plates which have reactant gas flow fields on one side and water coolant channels on the other side, to provide both the function of water management and the function of cooling the fuel cells. This requires a balance between promoting the flow of water through the water transport plate to humidify both reactants and to the anode electrode, to ensure that the membrane remains humidified, and flowing product and proton drag water away from the cathode electrode, while at the same time not allowing the water to block the passage of reactant gas to the respective electrodes. Furthermore, water flow between the cathode of one cell and the anode of an adjacent cell is provided by not using a gas-impervious separator plate, but relying on bubble pressure to prevent gas crossover between cells. This may be controlled by a careful balance of pore size and pressure differential between the reactant gases and the coolant water. However, the production of water transport plates with the proper size pores is extremely expensive. The utilization of larger pores for high water permeability while at the same time the utilization of smaller pores for high bubble pressure to prevent fuel reactant gas crossing over and mixing with the oxidant reactant gas, poses the dilemma; enhancement of one harms the other and vice versa. Fuel cells of this type are illustrated in commonly owned U.S. Pat. Nos. 5,503,944 and 5,700,595.

One problem with water transport plates, which utilize pure fuel cell water as the coolant, is that such fuel cells will freeze in cold climates, when not operating. Furthermore, the use of substances other than water in the water flow fields, to enhance thawing and initial startup, adulterates the fuel cell causing performance degradation.

DISCLOSURE OF INVENTION

Objects of the invention include the separation of water management from cooling in a PEM fuel cell; a PEM fuel cell which can use antifreeze solutions as a coolant; PEM fuel cells which can utilize start-up solutions to assist in thawing, when frozen; PEM fuel cells which do not require high tolerance, fine pore porous reactant flow field plates; PEM fuel cells employing easily manufactured, low tolerance plates for reactant flow fields and/or water management.

According to the present invention, passive water management in a PEM fuel cell includes oxidant reactant gas and fuel reactant gas flow field plates, at least one of which includes water flow fields on the reverse side thereof, the water flow fields being dead ended at ends thereof which are near the corresponding reactant gas inlet, and which flow into the related reactant gas exhaust manifold. In some embodiments, individual fuel cells of a stack are separated by gas-impervious plates; in one embodiment, at least some of the separator plates are cooling plates having coolant flow channels therein; in some embodiments, at least some of the separator plates are solid. The water management flow fields are thus at nearly the same pressure as the corresponding reactant gas exit manifold pressure; this pressure is lower than the pressure of the respective gas flow fields. The reactant gas pressure, in the reactant flow field, is maintained at a pressure which is substantially higher than the respective reactant gas exit manifold. The pressure differential is achieved by flow restrictions in the reactant gas flow field outlet. The pressure differential provides the driving force for moving excess water from the reactant flow field, through a porous or a perforated reactant flow field plate, into the water flow fields, and out to the reactant gas exit manifold, where it is removed from the cell. The pressure differential also sets the level of saturation of the anode and cathode substrates when wettable hydrophilic substrates are used.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
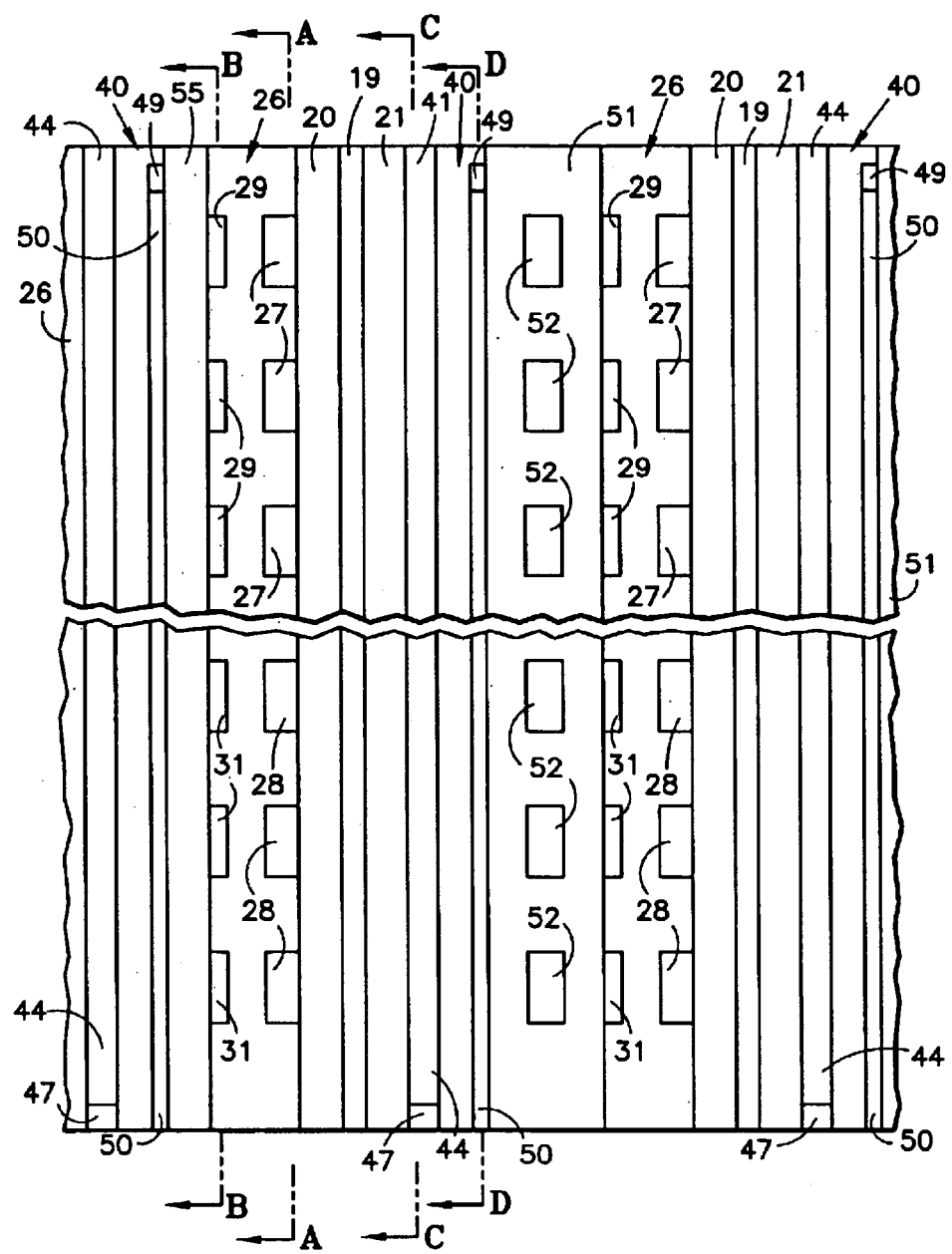
FIG. 1 is a partial, sectioned, end elevation view of a fuel cell incorporating the invention, taken on the line X—X in FIGS. 2–5.
Figure 2:
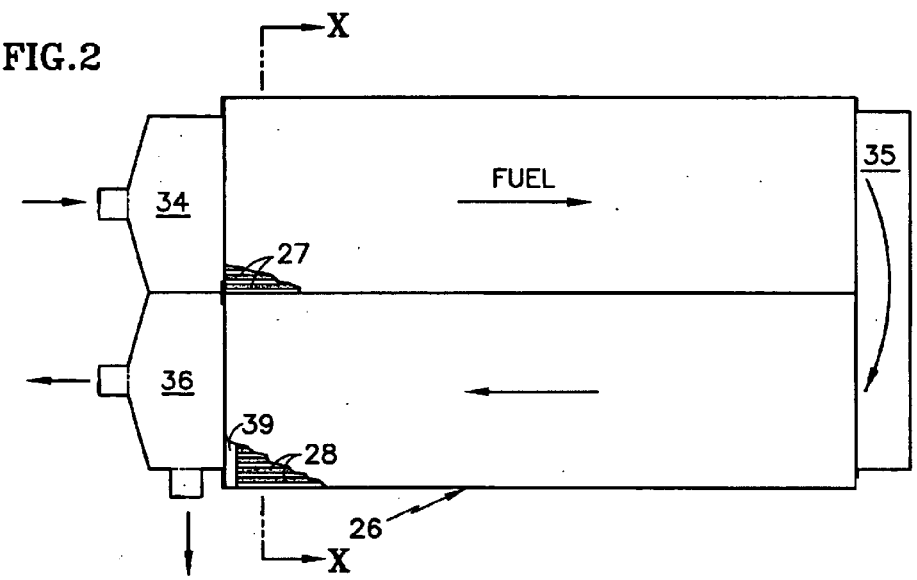
FIG. 2 is a simplified, stylized, side elevation view of the fuel reactant gas flow field and manifolds, partially broken away on the line A—A of FIG. 1.
Figure 3:
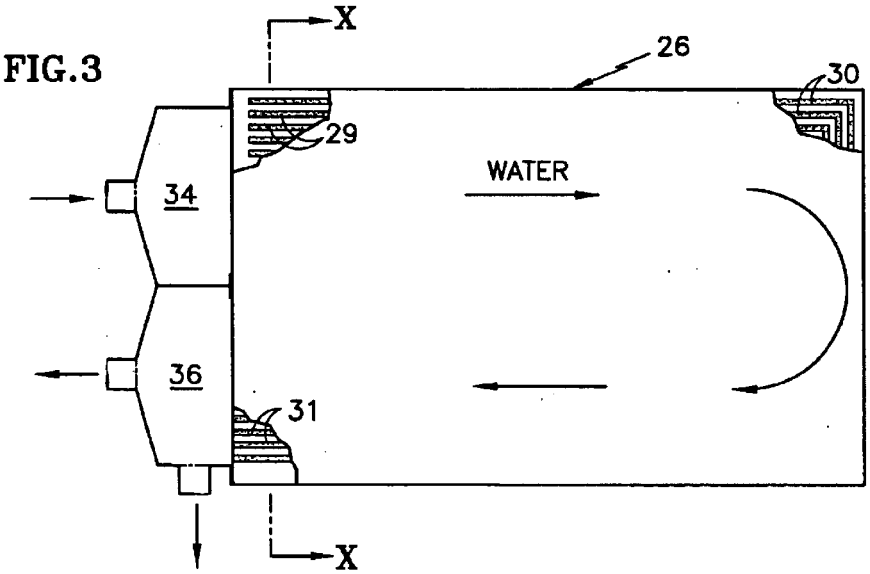
FIG. 3 is a simplified, stylized, side elevation view of anode water management flow channels, partially broken away on the line B—B of FIG. 1.

Referring to FIG. 1, a fuel cell stack includes a plurality of fuel cells, each including a PEM 19, an anode substrate 20, with an anode catalyst (not shown) disposed between the membrane 19 and the substrate 20. A cathode catalyst (not shown) extends between the membrane 19 and a cathode substrate 21. A porous anode flow field plate 26 includes fuel reactant gas flow channels 27, 28 on the side thereof adjacent the anode substrate 20 and water flow channels 29–31 on the reverse side thereof. In the exemplary embodiment, as shown in FIG. 2, the fuel flow channels 27 run horizontally from a fuel inlet manifold 34 to a fuel turnaround manifold 35 and the fuel flow channels 28 run from the fuel turnaround manifold 35 to a fuel exit manifold 36. As seen in FIG. 3, the ends 29 of water management channels are dead ended in the region near the fuel inlet manifold 34, and form corners 30 at the opposite end of the fuel flow field plate 26 where they turn toward the other edge of the plate 26; thereafter, they turn again and run toward the fuel exit manifold 36, in the region of which the ends 31 of the water management channels flow freely into the fuel exit manifold 36. Other water flow field configurations are possible. The water management flow fields may be channels as shown or other geometric shapes that are known in the art. The water management flow fields may be integral to the reactant flow field plate or may be adjacent to the flow field plate. For instance, the water management flow fields may be on the surface of the reactant flow field plate or may be on the surface of the adjacent separator or cooler plate. The water management flow field plate may be a flat monolith that does not contain channels, but is porous with a high water permeability for moving water from one section of the cell to another section of the cell.

The reactant flow fields must each contain a flow restrictor 39 (FIG. 2) in the vicinity of its discharge to the reactant exhaust manifold, to create a backpressure within the reactant flow field which is about 0.2 to 2.0 psi (1.4 to 14.0 kPa) greater than the pressure in the reactant exhaust manifold. One form of flow restrictor is a particulate material within the channels 28 in the anode flow field that creates a flow resistance. Those skilled in the art can define a pore size and length of the flow restrictor in order to create the desired backpressure in any implementation of the invention.

Figure 4:
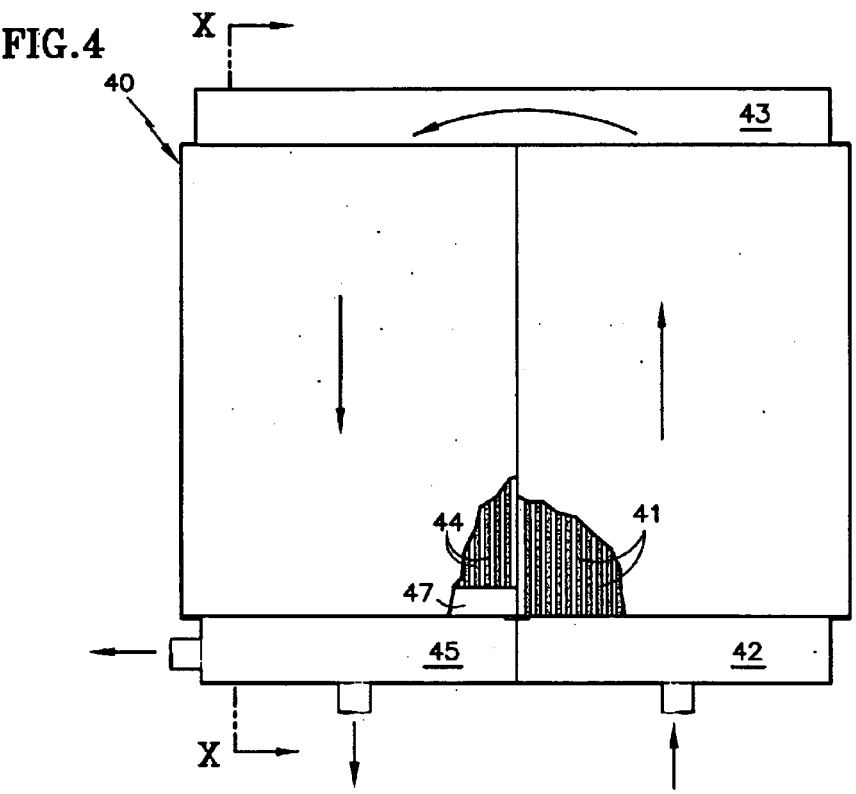
FIG. 4 is a simplified, stylized, side elevation view of oxidant flow fields and manifolds, partially broken away on the line C—C of FIG. 1.
Figure 5:
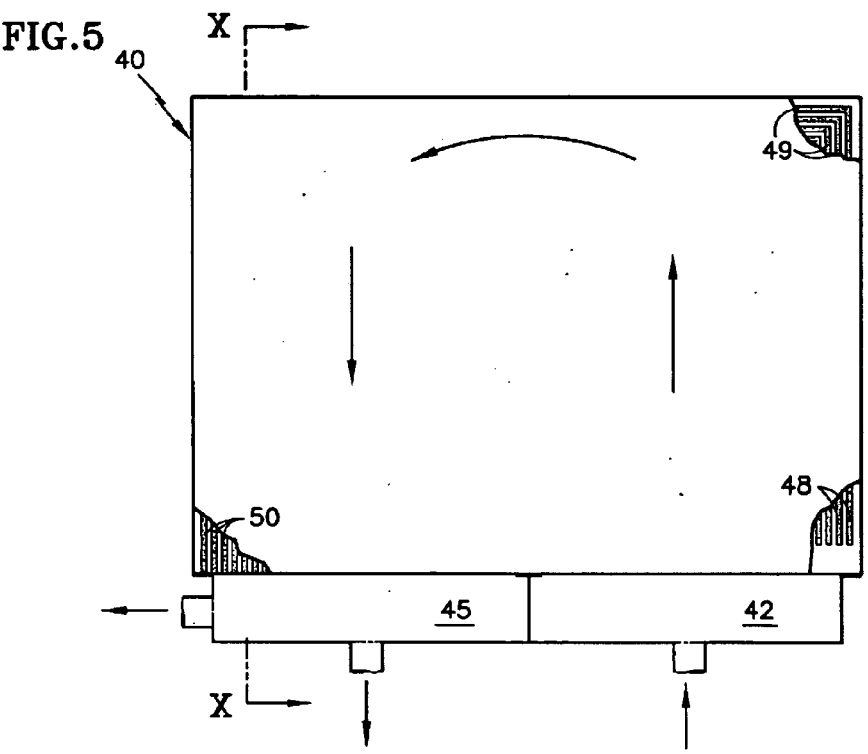
FIG. 5 is a simplified, stylized, side elevation view of cathode water flow channels, partially broken away on the line D—D of FIG. 1.

Each cell also has a porous oxidant reactant gas flow field plate 40, which as seen in FIGS. 1 and 4 has oxidant flow channels 41 extending from an oxidant inlet manifold 42 to an oxidant turnaround manifold 43, and oxidant flow channels 44 which extend from the turnaround manifold 43 to an oxidant exhaust manifold 45. The flow fields 44 have a flow restrictor 47 to maintain a backpressure, as described with respect to the flow restrictor 39, hereinbefore. The flow restrictor may be formed by simply not having the channels 44 extend all the way to the exit manifold 45, requiring the flow to pass through the porous substrate of the flow field plate 40. The oxidant flow field plates 40, as seen in FIG. 5, have on the reverse side thereof water flow channels, the ends 48 of which are dead ended in a region near the oxidant inlet manifold 42, form corners 49 at the other edge of the plate 40, then run toward the opposite side of the plate 40, and turn again with channels 50 that run toward the oxidant exhaust manifold 45. Other water flow field configurations may be used, as described hereinbefore. According to the invention, the ends 50 of the cathode water flow fields drain into the oxidant exhaust manifold 45.

Either or both of the anode substrate 20 and cathode substrate 21 may be one of either (a) a wettable and hydrophilic substrate, (b) a wetproofed and hydrophobic substrate, or (c) partially of each (a) and (b), as is known in the prior art. If desired in any implementation of the invention, a wettable cathode substrate may be provided with a wetproofed anode substrate or vice versa; other combinations may be used.

In FIG. 1, the cathode flow field plates 40 may be separated from the anode flow field plates 26 either by a gas impervious separator plate, which may be a cooler plate 51 having coolant channels 52 therein, or which may be a solid plate 55. There may be one cooler plate 51 for several fuel cells, the remaining fuel cells being separated by solid plates 55, or the entire fuel cell stack may be separated by either cooler plates 51 or solid plates 55, as desired.

The embodiment described with respect to FIGS. 1–5 may require that either or both of the reactant gases be humidified prior to entering the fuel cell stack; this may be achieved by spraying water into the reactants, passing the reactants through a packed bed contact saturator, passing the reactants through an enthalpy exchange device, using reactant recycle, or other ways known to the prior art.

If desired in any implementation of the invention, water flow fields may be provided only at the cathode side and not at the anode side, or vice versa.

Figure 6:
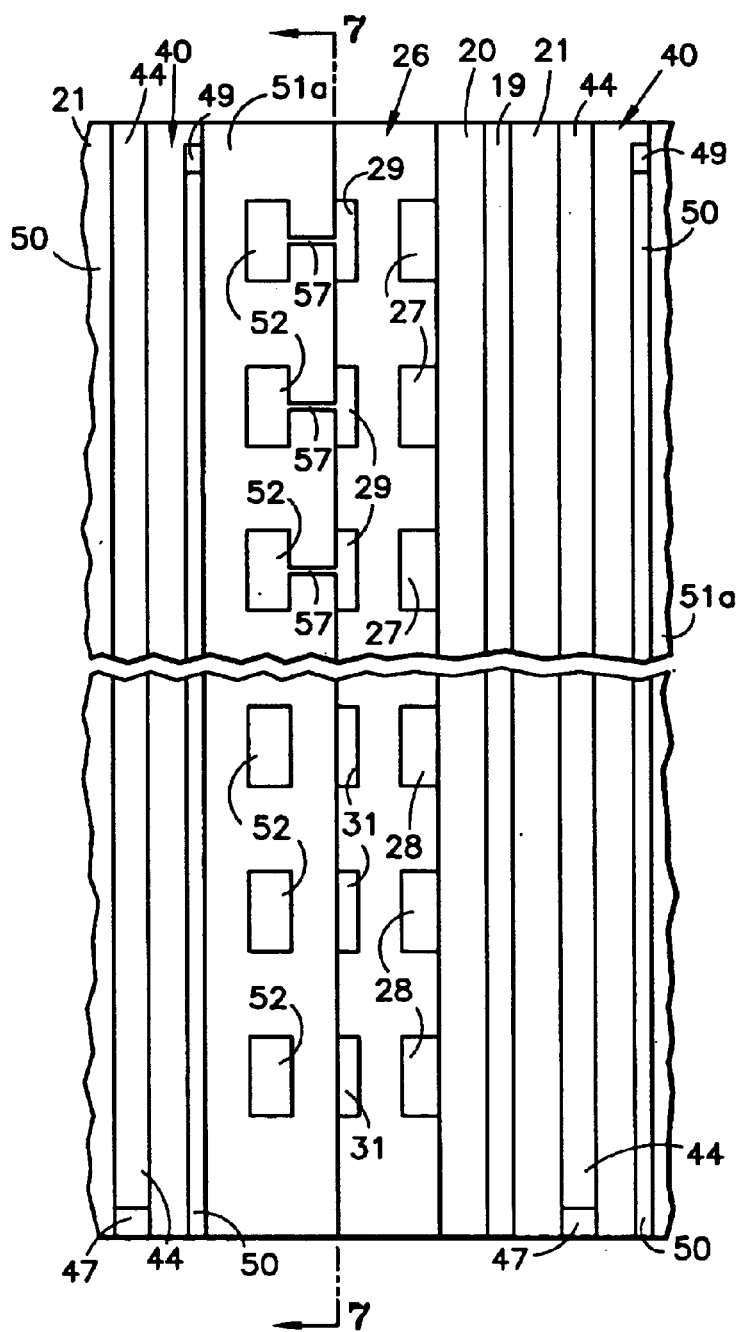
FIG. 6 is a partial, sectioned, end elevation view of a fuel cell incorporating another aspect of the invention.
Figure 7:
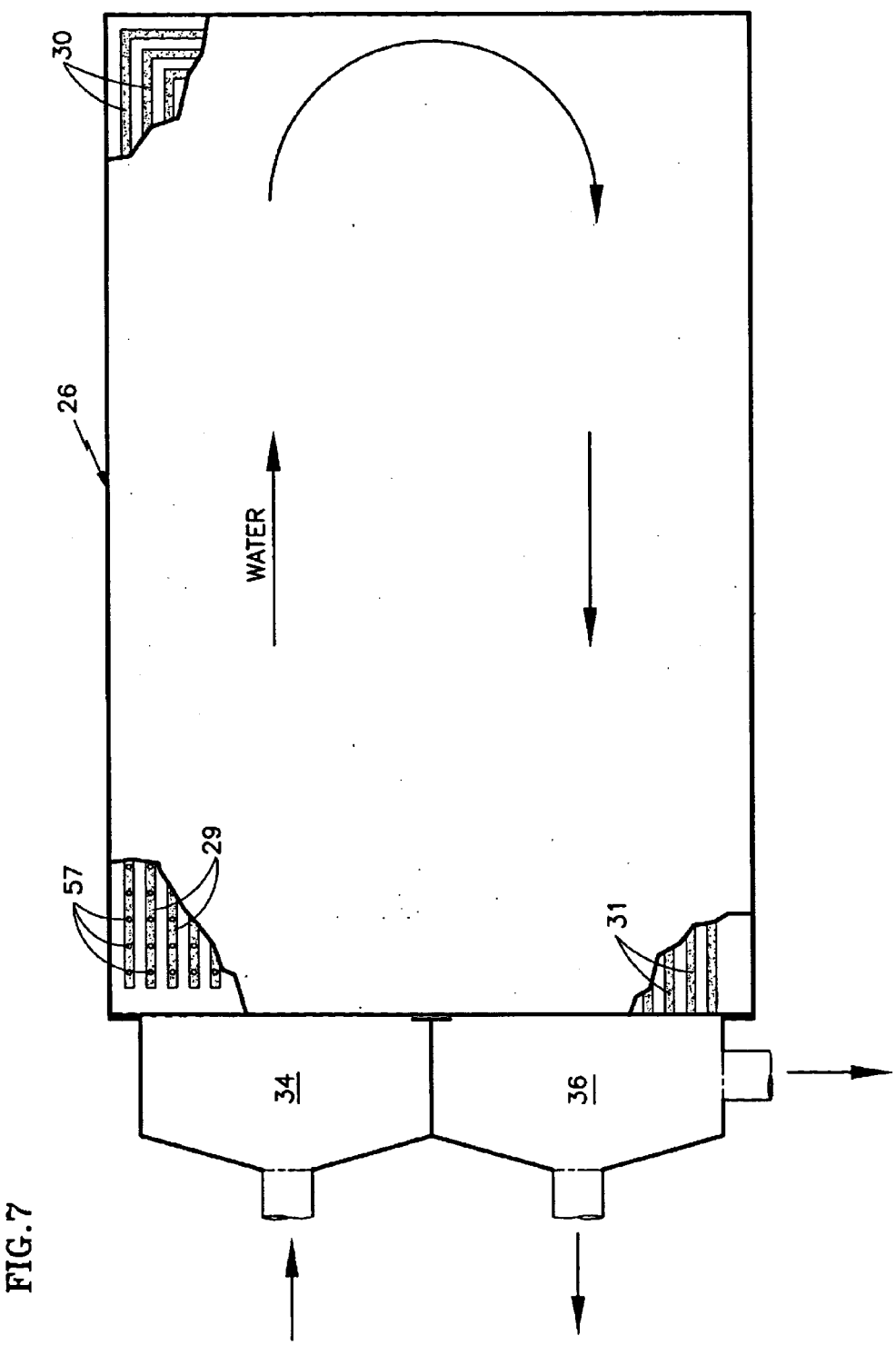
FIG. 7 is a simplified, stylized, side elevation view of anode water management flow channels, partially broken away on the line 7—7 of FIG. 6.

A second aspect of the present invention alleviates the need to externally humidify one or both of the reactant gases. In one embodiment of this aspect of the invention, illustrated in FIGS. 6 and 7, a modified cooler plate 51a has weep holes 57 between the ends 29 of the fuel reactant gas channels in the region of the fuel inlet 34 and the coolant water channels 52 adjacent thereto. This will supply a constant water influx into the water channels 29, 30, 31 to ensure that the anode side of the PEM will be adequately moisturized. In this case, however, pure, deionized water must be used as the coolant. The weep holes 57 may be filled with a particulate filler which increases the resistance to flow and facilitates pressure control between the water and the reactant. This concept may also be used to humidify the oxidant by providing weep holes to the cathode flow field 40 in the vicinity of the air inlet manifold 42.

Figure 8:
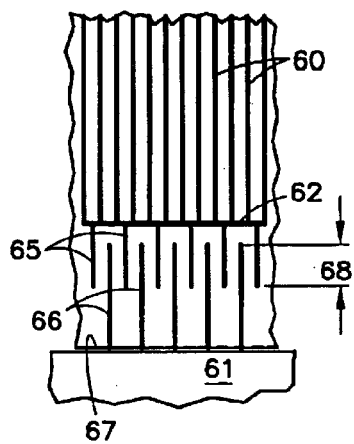
FIG. 8 is a simplified schematic illustration of an interdigitated flow restrictor associated with a free-flow reactant gas flow field plate.
Figure 9:
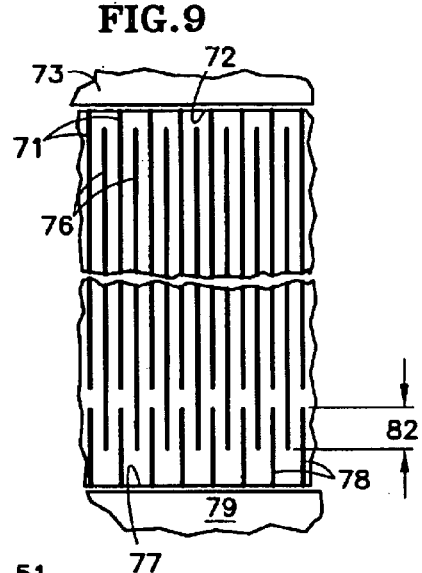
FIG. 9 is a simplified schematic illustration of an interdigitated flow restrictor associated with an interdigitated flow field plate.

The flow restrictions 39, 47 may be interdigitated reactant gas flow channels, as illustrated in FIGS. 8 and 9. In FIG. 8, the reactant gas flow channels 60 are straight flow channels; however, the flow channels 60 do not flow into the reactant gas exhaust manifold 61, but rather flow into a manifold channel 62. From the channel 62, the reactant gas will flow in inlet interdigitated flow field channels 65 and then pass through the substrate into outlet interdigitated flow field channels 66, which are open to the edge 67 of the flow field plate, thereby allowing the gas to pass into the reactant gas exit manifold 61. The dimension indicated by the arrow 68, which comprises the extent of overlap between the inlet channels 65 and the outlet channels 66 will determine the amount of backpressure. FIG. 9 illustrates a situation in which the entire flow field is interdigitated. In FIG. 9, the inlet reactant gas flow channels 71 extend from the edge 72 of the flow field plate so that gas will enter the channels 71 from the reactant gas inlet manifold 73. The interdigitated outlet flow channels 76 do not, as in the usual case, reach the outlet edge 77 of the flow field plate. Instead, exit reactant gas flow channels extend from the edge 77 of the flow field plate in overlapping relationship with the channels 76. Thus, the reactant gas must flow from the inlet channel 71 to the outlet channel 76, and then from the outlet channel 76 to the exit channel 78 and thence into the reactant gas exit manifold 79. The dimension indicated by the arrow 82, which denotes the overlap between the outlet channels 76 and the exit channels 78 will control the backpressure in the gas reactant channels 71, 76.

Some reactant gas flow fields may present a sufficiently tortuous route so that there is a significant drop in reactant gas pressure across the flow field to meet the needs of the invention. An example is a flow field comprised of a few serpentine channels. In such a case, discrete flow restrictions 39, 47, 68, 82 may be obviated.

Figure 10:
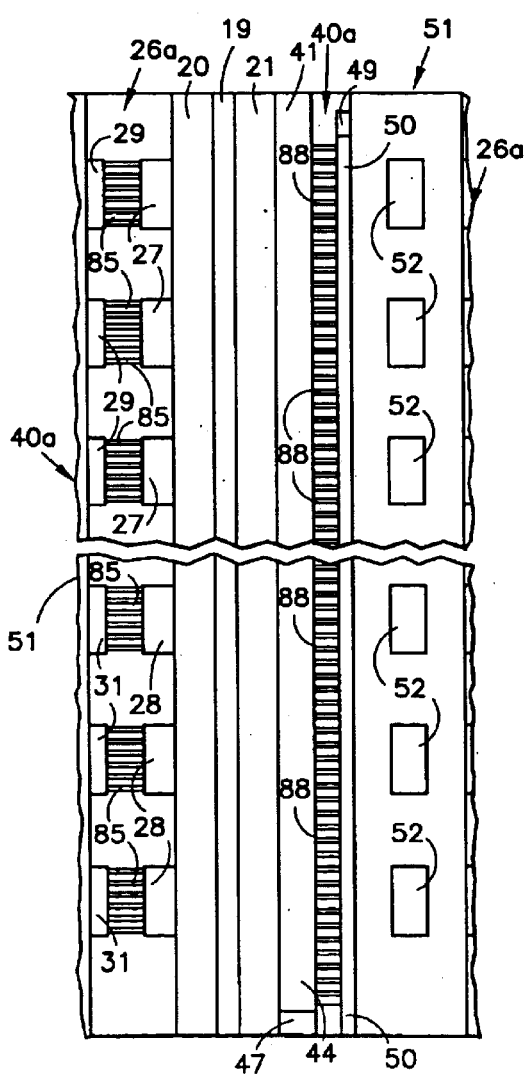
FIG. 10 is a partial, sectioned, end elevation view of a fuel cell according to the invention, incorporating solid, rather than porous, flow field plate, with water flow holes or perforations between reactant gas channels and water drain channels.

One advantage of the present invention is that, with very low pressure operation, and with no need to have a negative water channel pressure, non-porous, solid flow field plates may be used in place of the typical porous flow field plates. In FIG. 10, the fuel reactant gas flow field plate 26a is solid, but has a plurality of small holes or perforations 85 between each of the fuel flow channels 27, 28 on one face of the flow field and the water drain channels 29–31 on the reverse face of the flow field plate. The holes can be molded in or can be provided otherwise after the flow field plate is formed. This alleviates the difficulties of forming porous flow field plates which require both close control over the pore size and close control of the flow field geometry, which has heretofore prevented molding these plates, in contrast with machining them. A feature is that any tendency for one of the reactant gas flow channels 27, 28 to become blocked with a water drop will cause the full channel pressure drop to be applied to the drop, thereby forcing it through the holes 85 into the water drain channels 29, 30. Similarly, a solid oxidant reactant gas flow field plate 40a has a plurality of small diameter holes 88 extending from each of the oxidant reactant gas flow channels 41, 44 and a corresponding water channel 50. The holes 85, 88 may also be filled with a particulate material creating a porous plug that will transmit water while providing a barrier to gas transfer. Small levels of reactant gas leakage through the holes (e.g., 5%–10% of reactant gas flow) is acceptable.

All of the aforementioned U.S. patents are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A fuel cell comprising:

an anode substrate and a cathode substrate and a proton exchange membrane disposed between said substrates;

an anode flow field plate providing a fuel reactant gas flow field adjacent said anode substrate;

a cathode flow field plate providing an oxidant reactant gas flow field adjacent said cathode substrate;

said fuel reactant gas flow field receiving fuel from a fuel reactant gas inlet manifold and exhausting into a fuel reactant gas exhaust manifold;

said oxidant reactant gas flow field receiving oxidant from an oxidant reactant gas inlet manifold and exhausting into an oxidant reactant gas exit manifold; and at least one of said flow field plates being porous and having a water flow field on a side of said at least one of said flow field plates opposite the corresponding one of said reactant gas flow fields, said water flow field being dead ended in the region of the corresponding one of said reactant gas inlet manifolds and opening into the corresponding one of said reactant gas exit manifolds, and having a flow restrictor at the exhaust end thereof to maintain the pressure of reactant gas in said one flow reactant gas field above the pressure of reactant gas in said corresponding one of said reactant gas exit manifolds.

2. A fuel cell stack comprising:

a plurality of fuel cells according to claim 1;

and a gas impervious separator plate separating each of said fuel cells from adjacent ones of said fuel cells, said separator plate selected from (a) a cooling plate having a coolant flow field therein and (b) a solid plate.

3. Fuel cell according to claim 1 wherein:

said flow restrictor maintains the pressure of reactant gas between 0.2 and 2.0 psi above the pressure in the corresponding exit manifold.

4. A fuel cell stack comprising:

a plurality of fuel cells according to claim 1;

a plurality of cooling plates, each having a coolant flow field therein, each of said fuel cells being separated from a fuel cell adjacent thereto by one of said cooling plates, a portion of each of said coolant flow fields coaligned with a portion of at least one of said reactant flow fields in the vicinity of said reactant gas inlet manifold, there being at least one weep hole between said portion of each said coolant flow field and the one of said reactant gas flow fields coalianed therewith.

5. A fuel cell according to claim 1 wherein: said flow restrictor comprises interdigitated reactant gas flow field channels.

6. A fuel cell according to claim 1 wherein:

at least one of said substrates is porous and is selected from (a) a hydrophilic substrate, (b) a wetproofed substrate, and c) a substrate which is partially hydrophilic and partially wetproofed.

7. A fuel cell according to claim 1 wherein:

at least one of said flow field plates is solid with reactant gas flow channels and small holes extending from said channels into said water flow field.

8. A fuel cell according to claim 7 wherein:

said small holes are filled with a particulate material thereby forming a porous plug.

* * * * *